United States Patent [19]

Handke

[11] 4,250,983
[45] Feb. 17, 1981

[54] CLUTCH APPARATUS AND CONTROL

[76] Inventor: Kenneth E. Handke, 2034 Mayview Ave., Cleveland, Ohio 44109

[21] Appl. No.: 56,637

[22] Filed: Jul. 11, 1979

Related U.S. Application Data

[63] Continuation-in-part of Ser. No. 829,273, Aug. 31, 1977, abandoned, which is a continuation-in-part of Ser. No. 325,553, Jan. 22, 1973, abandoned, which is a continuation-in-part of Ser. No. 170,852, Aug. 11, 1971, abandoned.

[51] Int. Cl.³ .............. F16D 43/04; F16D 35/00; F16D 67/06
[52] U.S. Cl. .............. 192/12 D; 192/18 B; 192/58 C; 192/84 C; 192/103 R; 192/107 M; 192/113 B
[58] Field of Search .............. 192/12 D, 17 C, 18 B, 192/57, 58 B, 58 C, 84 R, 84 C, 103 R, 103 F, 104 R, 104 F, 107 M, 113 B; 29/156.8 FC

[56] References Cited

U.S. PATENT DOCUMENTS

| | | | |
|---|---|---|---|
| 2,079,724 | 5/1937 | Ranst | 192/58 C |
| 2,576,156 | 11/1951 | Trofimov | 192/58 C |
| 2,714,946 | 8/1955 | Tenot et al. | 192/113 B X |
| 2,850,654 | 9/1958 | Jaeschke | 192/104 R X |
| 2,884,107 | 4/1957 | Frankel | 192/113 B X |
| 3,032,668 | 5/1962 | Robinson et al. | 192/104 R |
| 3,088,567 | 5/1963 | Fischer et al. | 192/113 B X |
| 3,123,193 | 3/1964 | Marland | 192/18 B |
| 3,385,986 | 5/1968 | Smith | 192/104 R |
| 3,390,548 | 7/1968 | Rogerson et al. | 66/56 |
| 3,390,751 | 7/1968 | Rogerson et al. | 192/113 B X |
| 3,473,638 | 10/1969 | Brucken et al. | 192/104 R |
| 3,554,860 | 1/1971 | LaCroix, Jr. | 192/107 M X |
| 3,585,822 | 6/1971 | Worst | 192/104 R X |
| 3,599,764 | 8/1971 | Daab et al. | 192/103 R |
| 3,834,502 | 9/1974 | Sommer | 192/113 B X |

OTHER PUBLICATIONS

Machine Design, vol. 37, No. 27, Nov. 1965, p. 159, Haydon Products, "Magnetically Controlled Oil Shear Regulates Drive."
Machine Design, vol. 32, No. 16, Aug. 1960, pp. 113-122, Kotmik, "Electromagnetic Disc Clutches."

Primary Examiner—Allan D. Herrmann
Attorney, Agent, or Firm—Pearne, Gordon, Sessions, McCoy & Granger

[57] ABSTRACT

A variable speed drive mounted within a housing includes clutch means of the disc type operatively connected between input and output shafts and an interior support coupling member. The support coupling member comprises a stationary support extending from the housing and concentric bearings for mounting a center coupling therein. The center coupling receives the extreme inboard ends of the shafts to provide support thereof and it is operatively connected between the clutch means and the output shaft to transmit torque. The concentric bearings permit relative rotation between one of the shafts and the center coupling, and provide bearing support for both of the shafts within the stationary support member. An electronic control system is also provided for the variable speed drive which senses output errors and uses them to directly modulate the power signal to an electromagnetic clutch or brake component of the drive. The control system may be utilized to provide a variable speed drive with forward and reverse operation as well as a positive or retarding torque in either direction.

31 Claims, 8 Drawing Figures

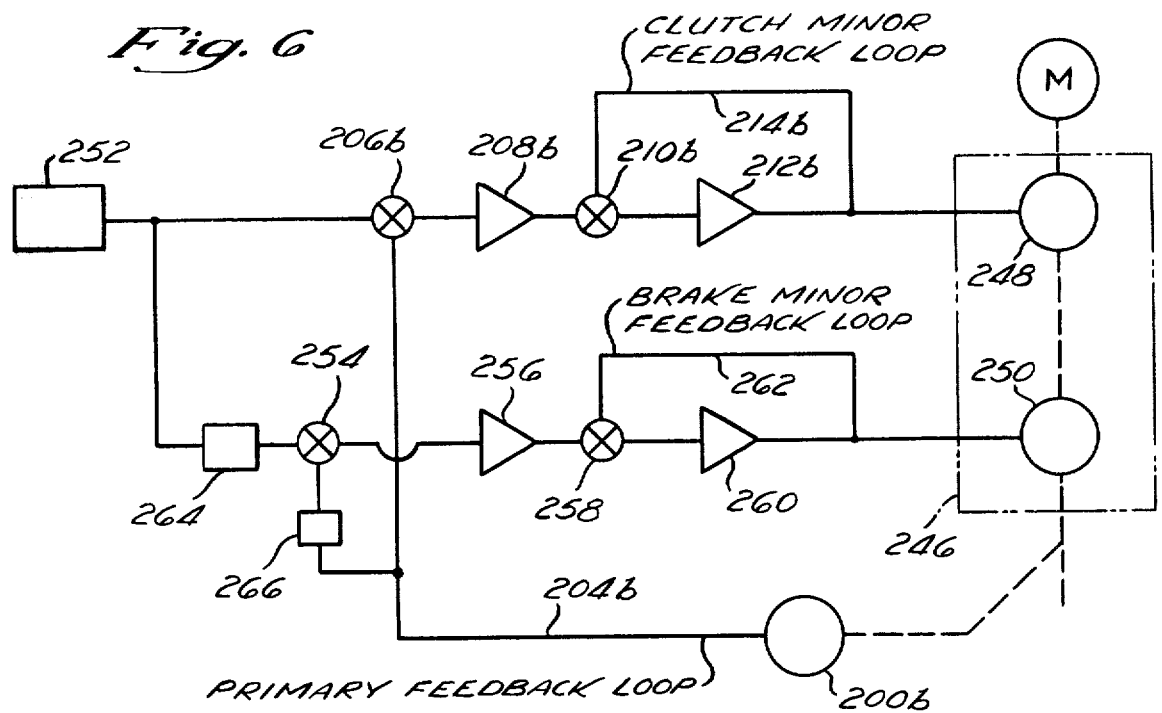
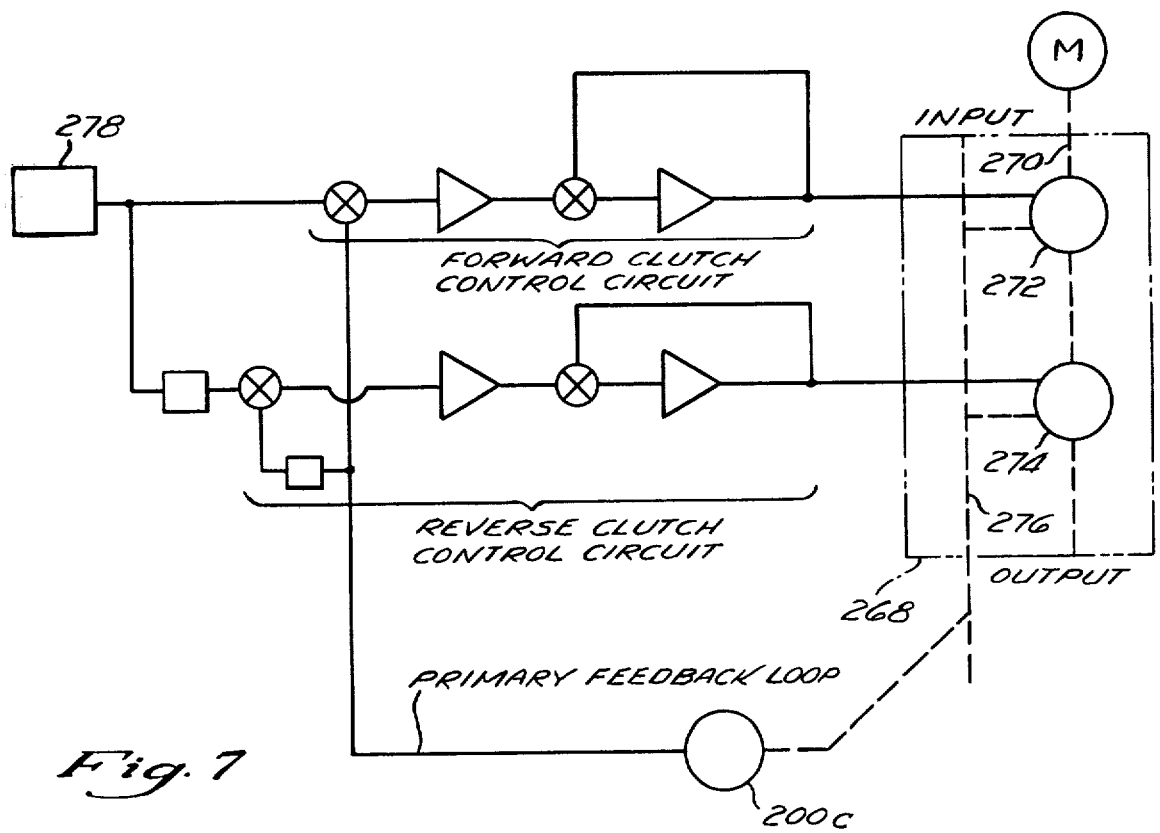

CLUTCH APPARATUS AND CONTROL

BACKGROUND OF THE INVENTION

This application is a continuation-in-part of my copending application Ser. No. 829,273, filed Aug. 31, 1977, now abandoned which is a continuation-in-part of my then copending application Ser. No. 325,553, filed Jan. 22, 1973, now abandoned, which is in turn a continuation-in-part of my then copending application Ser. No. 170,852, filed Aug. 11, 1971, now abandoned.

The present invention generally relates to disc type torque-transmitting units of the hydroviscous or wet type wherein films of fluid are maintained between adjacent discs for purposes of torque transmission. In a particular aspect, the invention relates to a variable speed drive mounted within a housing having a support coupling member therein to provide rigid bearing support for the inboard ends of the shafts and to transmit torque. In a further aspect, the present invention also provides an improved control system for such drives wherein the advantages of an electrical controller are efficiently utilized in combination with the electromagnetic actuation of a clutch or brake component of the drive.

The prior art discloses a variety of variable speed drive units wherein a disc type clutch is connected between input and output shafts for the transmission of torque. The drive unit is typically mounted within a housing which provides outboard bearing support for the shafts in or on the opposed walls of the housing. In order to effectively cope with radial loading of the shafts and minimize the degree of cantilever support thereof, additional interior bearing support for each of the shafts is generally provided intermediate the outboard bearings and the clutch.

In many instances, an independent, additional interior bearing support is provided adjacent each of the shaft ends, resulting in the use of four independent bearing supports in the drive unit. Alternatively, a structure having multiple, axially spaced bearings which are themselves supported in a cantilever arrangement may be employed in the drive unit. In all such units, the extreme inboard ends of the shafts are subject to a degree of cantilever support since the ends are directly connected to the clutch, which cannot be conveniently supported in a rigid structure. Of course, the restraint of radial loads and radial displacement of the shafts is not efficiently achieved in a cantilever support arrangement.

It should be appreciated that disc type clutch means are not flexible couplings and the axial-radial alignment thereof must be maintained within a close tolerance range. For example, if axial movement resulted in engagement of the clutch body and driven gear, a drag load resulting in overheating would result. Conversely, if the body and gear were actually spaced beyond the tolerance range, the discs would slip off the gear, resulting in a loss of torque and eventual clutch failure. Similar problems occur if radial alignment is not maintained, since it also results in irregular disc wear and/or tracking of the rotating discs, which will eventually result in clutch failure. The adequacy of the bearing support and maintenance of proper alignment are especially critical when the drive unit is employed in a cyclic operation involving variable loads. Thus, the prior art units have not been entirely satisfactory structurally.

In addition to the structural problems, the economic disadvantages of multiple, independent bearings and cantilever bearing arrangements for support of the shafts should be appreciated. Further, the axial spacing required by multiple inboard bearings necessitates an increased axial length of the unit, resulting in commensurate cost increases and undesirable bulk of the unit.

In a variable speed drive application utilizing hydroviscous or wet type torque-transmitting units, the prior art discloses numerous control systems for regulating the operation of hydraulic and pneumatic clutch components including manual control systems having mechanical feedback arrangements such as that shown in U.S. Pat. No. 2,576,156. Aside from manually operated systems, automatic prior art control systems necessarily employ transducers such as servo valves to convert electric control signals to appropriate hydraulic or pneumatic output or power signals to the clutch component. Thus, the prior art has failed to appreciate the advantages to be obtained from the use of electromagnetic clutch actuation and an electrical control system in a variable speed drive application. In addition, the prior art systems have a number of disadvantages resulting from the complexity of an integrated electrical and mechanical structure as noted below.

In contrast with the present invention, some prior art systems are electromechanical and utilize electrical as well as hydraulic or pneumatic pressure means in their operation. In the case of a hydraulically operated clutch component which is operated through a servo valve, not only are electrical supplies required to power the feedback circuitry, but it is also necessary to supply a source of hydraulic power, which requires a hydraulic pump, a rotating input to the hydraulic pump, and a relief valve. In the case of a pneumatic clutch, air compressors or some other source of pneumatic pressure along with electrical power must be supplied.

An inherent disadvantage in the foregoing prior art systems is the necessity of mating an electronic feedback loop having an essentially instantaneous response time to a mechanical system with a relatively slow corrective action. In such an arrangement, the full capabilities of the electrical feedback system are not utilized since it must be adjusted to the mechanical lag time. In the pneumatic or hydraulic systems, changes in the power or pressure signals to the clutch component must be produced by movement of mechanical elements in the servo valve. These elements have some amount of lag and friction and their operation requires discrete amounts of time.

It is apparent that such electromechanical arrangements must be mated to each other in a nearly perfect balance for the feedback to operate properly. Even if the system is initially balanced, it is difficult to maintain this balance since all such servo arrangements depend on movement of mechanical parts to regulate or modulate output pressure. Of course, this makes their operation subject to mechanical wear and/or mechanical damage, which may destroy the balance.

The presence of mechanical elements in such prior art control systems also tends to cause variations in start-up performance at different ambient temperatures. For example, in hydraulic systems, the servo valve does not operate as readily when it is operating with a flow of viscous, cold oil.

Further, it has been observed that prior art electromechanical systems tend to result in comparatively less efficient operation in that the range of controlled output speeds resulting from a fixed rotational input to the system is substantially less than the range obtained in accordance with the present invention. In addition, the degree of control or maintenance of a preselected output speed value is not as precise as that obtained in the present invention. The operational improvements provided by the system of the present invention are believed to be related to the elimination of mechanical elements in the control system and the relatively slow response times associated therewith.

The prior art also discloses hydroviscous torque-transmitting units of the "single disc type" wherein a single film of fluid is maintained between input and output shear plates which are respectively connected to input and output members. As discussed below in greater detail, electronic control systems with electromagnetic actuation to vary the spacing between the shear plates and regulate the torque transmission have been unsuccessfully attempted in such prior art systems. Applicant's own prior art torque-transmitting units combining electronic control and electromagnetic actuation have not consistently provided satisfactory operation in the absence of the discoveries and improvements disclosed herein and, consequently, effective commercial provision of such torque-transmitting units has not occurred.

SUMMARY OF THE INVENTION

The present invention provides a variable speed drive mounted within a housing having disc type clutch means operatively connected between input and output shafts and a support coupling member for providing bearing support of the adjacent inboard ends of the shafts and transmitting torque. The support coupling member comprises a stationary support extending from the housing and concentric bearing means for mounting a center coupling member in the stationary support to thereby provide rigid bearing support for the extreme inboard ends of the shafts. The concentric bearing means provide a first bearing member for permitting relative rotation between one of the shafts and the center coupling member which is operatively connected between the clutch and the other of the shafts. A second bearing member is disposed about the center coupling for permitting relative rotation between the center coupling and the stationary support member.

The support coupling member provides rigid bearing support at the inboard ends of the shafts, eliminating cantilever support thereof and the prior art problems associated with such arrangements. In addition, the support coupling minimizes the amount of axially extending space required for interior support of the shafts by utilizing concentric bearing means. Consequently, the prior art problems associated with the size of the variable drive unit and the efficient utilization of the zone defined by the housing are substantially eliminated.

The present invention also provides an electronic control system or controller in combination with electromagnetic clutch actuation in a variable speed drive application to thereby eliminate the prior art problems associated with electromechanical systems. In addition to monitoring the output speed in a primary feedback loop, the control system also provides a minor feedback loop which directly monitors the controller output or power signal to the clutch component. The controller output to the clutch, and more particularly the clutch current, increases or decreases with increasing or decreasing torque, presuming the output speed is held constant, and therefore may be used to stabilize the feedback of the control system.

The prior art electronically controlled, electromagnetically actuated, single disc type units have not been found to provide acceptable performance. The deficiencies of such prior art systems are generally related to the controllability of the system and, more particularly, to the inability to obtain stable operation. It is believed that single disc units do not provide satisfactory performance and stable operation due to the torque-transmitting characteristics of a single film of fluid and the high disc pressures required when only one disc is used. Specifically, at relatively high pressures and a given or fixed power signal, the single film of fluid in a single disc unit transmits torque as an increasing function of the output speed of the unit in conflict with electrical control input signals and tends to result in an unstable system.

The essentially electrical operation of the subject system in a variable speed drive application provides substantially improved response times and speed control throughout an increased output speed range in comparison with prior art arrangements. In addition to eliminating the disadvantages of mechanical components in the control system, the hydroviscous transmission of torque has been found to rapidly accept and respond to the precise input signals of an electrical control system. More particularly, the thickness of the torque-transmitting film intermediate the adjacent discs of the clutch component is believed to be sufficiently related to the actual torque transmitted to warrant the precise control of its thickness by electromagnetic means and an electrical control system. In order to fully utilize this relationship, it is necessary at a given power signal to avoid increasing torque transmission with increasing output speed of the unit, as occurred in single disc systems. This is required for compatibility with the corrective action of the electrical control system, which increases the power signal to provide an increase in output speed. Accordingly, torque transmission must be substantially independent of the output speed or inversely related thereto under conditions of constant electromagnetic actuation or coil current. These desirable torque transmission characteristics are attained in hydroviscous systems by providing a dynamic coefficient of friction between the liquid and the discs which remains equal to or decreases toward the static coefficient of friction upon increasing drive output speeds. The required coefficient of friction relationship is obtained through the proper selection of liquid and disc face compositions, as well as the use of a plurality of discs or torque-transmitting films of liquid, as described in detail hereinafter.

The combination of electronic actuation and electrical control in hydroviscous torque transmission has not heretofore been provided with recognition of the required torque transmission characteristics and coefficient of friction relationship and, therefore, the successful manufacture and commercial development of such torque-transmitting units has not been possible.

The control system may be effectively utilized to control forward and reverse operating drives which include a brake unit or its functional equivalent. As shown in the illustrated embodiments, the multiple torque-transmitting members of such drives may be controlled by multiple closed-loop electrical control circuits carrying control signals of the same magnitude but opposite sign.

BRIEF DESCRIPTION OF THE DRAWINGS

FIG. 6 is a block diagram of another embodiment of the control system of the present invention employed with a variable speed drive including clutch and brake units which are controlled by associated closed-loop circuits having reference and input signals of the same magnitude but opposite sign; and FIG. 7 is a block diagram of another embodiment of the control system of the present invention employed with a variable speed drive including forward and reverse clutch units controlled by associated closed-loop control circuits similar to those shown in FIG. 6, and arranged to provide forward and reverse operation with a positive or retarding torque in either direction of operation.

DETAILED DESCRIPTION OF THE DRAWINGS

Figure 1:
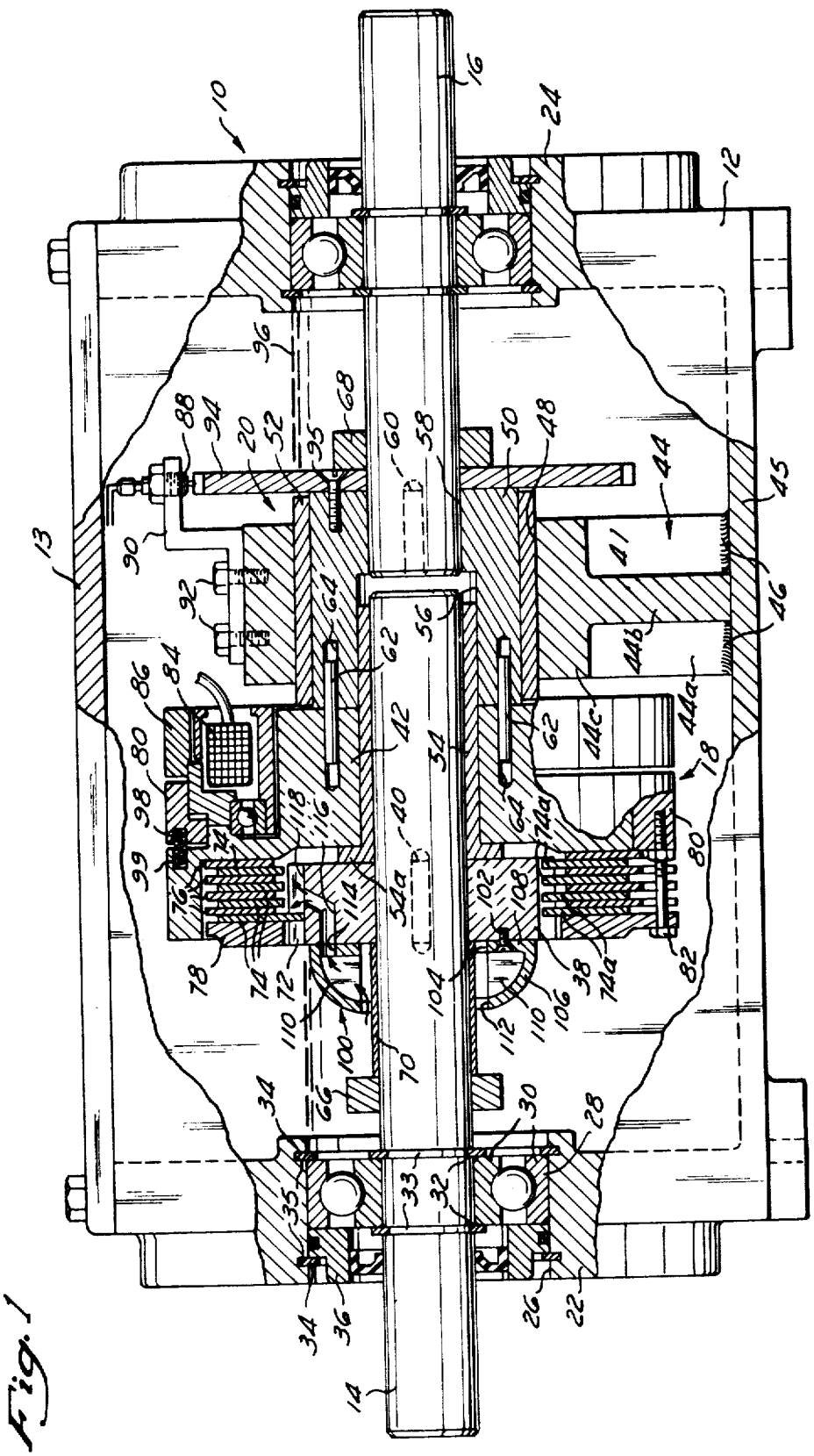
FIG. 1 is an elevational view, partially in section, of a variable speed drive unit mounted in a housing according to the present invention comprising clutch means operatively connected between input and output shafts, with parts broken away for purposes of illustration.

Referring to FIG. 1, there is shown a variable speed drive unit 10 mounted within a housing 12 having a removable top cover 13. The drive 10 includes axially aligned input shaft 14 and output shaft 15 which are operatively connected by means of an electromagnetic clutch 18 and a support coupling 20. The input torque to the unit may be provided by connection of the input shaft to any suitable prime mover such as an electrical motor (not shown).

The shafts 14 and 16 are provided with outboard bearing supports in or on oppositely disposed walls 22 and 24, respectively, of the housing 12. The outboard bearing support provided for each of the shafts is identical and only that provided for the shaft 14 will be described in detail, it being understood that identical outboard bearing support is provided for the shaft 16.

The input shaft 14 extends through a shaft bore 26 provided in the wall 22 of the housing. The shaft is supported in the bore 26 by ball bearing 28 having inner and outer races 30. The shaft 14 is provided with cooperating snap rings 32 disposed within shaft mounting grooves 33 to restrain axial movement of the shaft with respect to the bearing 28. Similarly, the bearing is restrained against axial movement with respect to the housing by means of cooperating snap rings 34 disposed in mounting grooves 35 extending about the bore 26. An oil seal 36 is provided within the bore 26 to form a seal between the bore and the shaft.

The clutch 18 includes a continuously rotating drive gear 38 which is connected to the input shaft by a key 40. Accordingly, the output torque of the clutch in this arrangement is through the clutch body 42 and it is transmitted to the output shaft 16 by means of the support coupling 20, as described in detail below.

The support coupling 20 comprises a stationary web support 44 extending from a lower wall 45 of the housing 12. The web support is fixed to the housing by weld 46; however, it may be connected by any suitable means or integrally formed with the housing. Similarly, the web support may be connected to any of the walls of the housing or otherwise fixed between two opposed walls of the housing in any suitable manner.

The web support 44 has an inverted U-shape including oppositely disposed, downwardly extending legs 44a (only one leg is shown in FIG. 1) which are connected by a cross member 44b. The upper portion of the web support includes a collar 44c having a bore 48 therethrough which is in radial alignment with the shafts 14 and 16.

A center coupling 50 having an annular configuration is mounted within the bore 48 by means of a sleeve bearing 52 which permits relative rotation between the center coupling and the web support. A sleeve-thrust bearing 54 is provided for mounting the inboard end of the shaft 14 within the center coupling and permitting relative rotation therebetween. To that end, the center coupling provides a first shaft bore 56 which is arranged to provide bearing support for the inboard end of the shaft 14 and an oppositely disposed second shaft bore 58 for receiving the output shaft 16 and providing bearing support thereof. The center coupling is keyed to the output shaft by means of key 60.

As indicated above, the clutch output in this arrangement is through the clutch body 42, which transmits the output torque to the center coupling 50 by means of axially extending drive pins 62 press-fitted within the bores 64. Each of the bores 64 may be formed by drilling associated bore halves in the clutch body portion 42 and the center coupling 50, which cooperate to define the bores 64 and captively retain the drive pins therein when the drive unit is assembled. Any suitable number of angularly spaced drive pins may be employed for the transmission of torque. Accordingly, when the clutch 18 is engaged, the output torque is transferred to the output shaft 16 by means of the center coupling 50.

It should be noted that the variable speed drive 10 could be oppositely connected so as to interchange the input and output functions of the shafts 14 and 16. A variety of mounting arrangements can be employed; however, it is frequently desirable to minimize the amount of clutch inertia which must be added to the load inertia. Accordingly, the input shaft is frequently connected to the clutch body, which is the higher inertia member.

The axial alignment of the clutch 18 and the support coupling 20 is maintained by a pair of oppositely disposed collar members 66 and 68 which are fixed to the shafts 14 and 16, respectively. The collar 66 cooperates with a sleeve 70 to maintain the axial position of the drive gear 38 against the flange 54a of the bearing 54. Similarly, the clutch body 42 and the center coupling 50 cooperate between the collar members 66 and 68 to maintain precise axial alignment of the clutch 13.

The support coupling provides rigid bearing support at the extreme inboard ends of the shafts to thereby eliminate the structural deficiencies associated with the cantilever support of the shafts and the use of multiple bearings mounted within a cantilever arrangement. Of course, the elimination of cantilever support of the shafts results in a more efficient bearing structure and, therefore, the support coupling requires a minimum amount of structure for a given loading to restrain the radial displacement of the shafts. The support coupling also minimizes the axial length of the interior bearing support and the drive unit by virtue of the concentric disposition of the bearings.

The operation of the variable speed drive 10 is briefly summarized below. Initially, it is noted that the clutch 18 has a generally cylindrical configuration and the plane of the section is not along a single diameter but, rather, along two intersecting radii in order to more clearly show the structure of the clutch. Further, it should be appreciated that the variable speed drive 10 may be provided with a disc type brake (not shown in FIG. 1) mounted on the output shaft and operatively fixed to the housing to provide braking engagement with the shaft.

The input to the clutch 18 is through the drive gear 38 having gear teeth 72 splined with inner drive discs 74. Interleaved with the drive discs 74 there are, of course, outer driven discs 76 which are splined with the clutch body 42, as shown in the lower portion of the clutch in FIG. 1. The drive discs 74 are formed of steel and have a non-metallic friction face or surface 74a (FIG. 1A) affixed on each side thereof for purposes of torque transmission and typically include liquid or oil distributing grooves. Such discs are referred to as "paper" discs and the friction face or surface material comprises a fibrous-resin matrix as described below. The driven discs 76 are formed of steel and do not have a special friction face or surface affixed thereto; such discs are referred to as being "unlined steel discs." Alternatively, the drive discs 74 may be unlined steel discs and the driven discs 76 may be faced with a non-metallic composition.

The axial proximity of the interleaved discs 74 and 76 or disc pack is controlled by a pressure plate 78, which may be actuated to impose a closing pressure upon the disc pack. The pressure plate 78 is connected to an armature 80 by means of bolts 82. The excitation of a stationary coil 84 sets up a magnetic flux circuit which attracts the armature 80 towards an outer field ring 86 to thereby close the disc pack by the following movement of the pressure plate 78 against the disc pack. Accordingly, adjustment of the electromagnetic actuation voltage and current in the coil 84 regulates the attraction of the pressure plate 78, the frictional fluid engagement of the discs 74 and 76, and the output speed of the unit.

The discs 74, 76 cooperate to provide a plurality of films of fluid or liquid for purposes of transmitting a constant torque under conditions of constant electromagnetic actuation or coil current independent of the output speed of the unit, or transmitting a torque which tends to decrease slightly with increasing output speeds upon use of proper liquid and disc compositions. In illustrative applications of plural discs, torque transmission independent of the output speed in a 5-horsepower variable speed unit has been obtained with the use of four films of fluid, even though eight films of fluid are generally employed. In larger horsepower size units, the number of films of fluid is increased and torque transmission remains independent of the output speed of the unit under conditions of constant electromagnetic actuation current.

As indicated, satisfactory operation in a 5-horsepower size drive unit is obtained with four films of fluid maintained between adjacent discs or adjacent discs and clutch surfaces such as those provided by the pressure plate 78 and the clutch body 42. In such a system, a total of three discs 74, 76 cooperate with clutch surfaces to provide active surfaces for the four films of fluid and torque transmission independent of the output speed of the unit when a constant current is maintained in the coil 84. However, it is generally preferred in commerical applications to provide 5-horsepower units with a sufficient number of discs to provide eight films of fluid. In larger size units, additional discs 74, 76 are employed and substantially constant torque transmission at a given level of coil current is maintained throughout the full speed range of the unit or, alternatively, a torque that tends to decrease with increasing output speeds.

Figure 4:
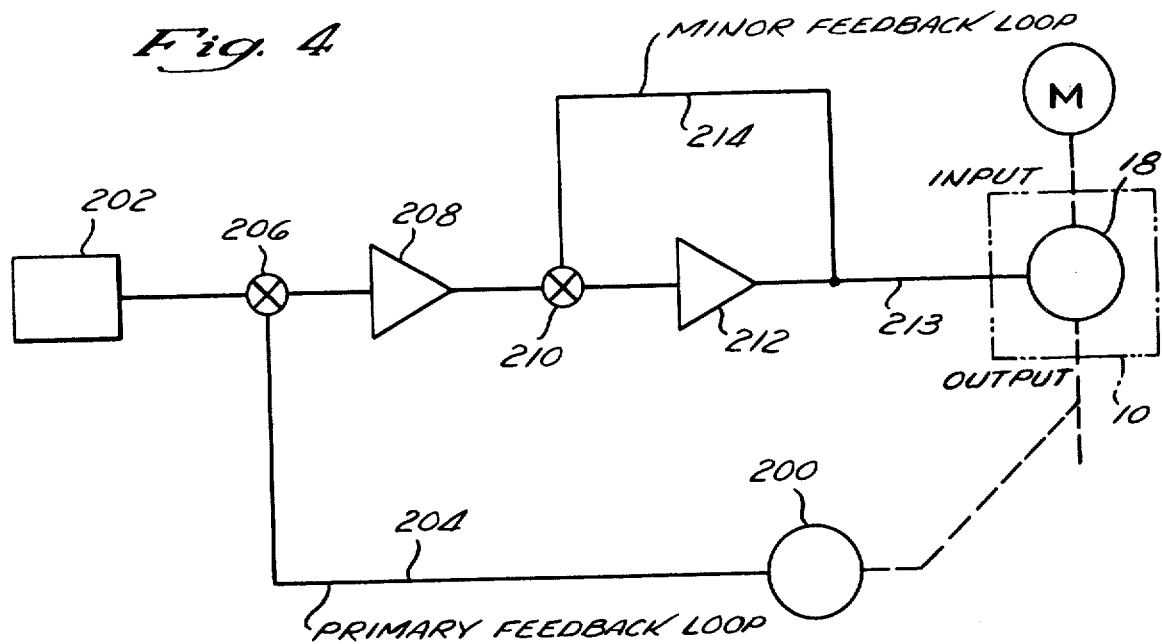
FIG. 4 is a block diagram of a control system in accordance with the present invention for the variable speed drive unit shown in FIG. 1.

The speed of the output shaft 16 is monitored by a magnetic pickup 88 carried by a bracket 90 which is mounted on the web support 44 by bolts 92. The magnetic pickup senses the rotational speed of a pulse gear 94 which is secured to the center coupling by bolts 95 (only one bolt is shown in FIG. 1). The magnetic pickup provides a feedback signal or voltage which is compared with a preselected set-point signal or reference voltage in a control system, as shown in FIG. 4 and discussed in greater detail hereinafter. Any deviation in the compared voltages results in an error signal which increases or decreases the voltage in the coil 84 to regulate the axial proximity of the discs 74 and 76 and the output speed of the unit.

The clutch 18 is a hydroviscous clutch wherein the torque is transmitted by a film of fluid or oil maintained between the adjacent discs and, more particularly, in inverse proportion to the thickness of the oil film between the adjacent discs. To that end, a supply or sump of oil 96 is maintained within the housing 12 for delivery to the discs. The oil is continuously delivered at a positive pressure to the discs by a pump 100 having an intake port 112 and exhaust ports 114 in registry with fluid duct means 116 and 118. The operation of the pump is described in greater detail in U.S. Pat. No. 3,912,160.

Referring to FIG. 4, a block diagram of a control system for the variable speed drive 10 is shown. For purposes of convenience, the details of the drive structure have been omitted and the clutch component 18 thereof is schematically illustrated.

The rotational input to the drive may be provided by any suitable prime mover, such as the electric motor M schematically shown. The rotational output speed of the drive 10 may be monitored by the magnetic pickup 88 as previously indicated, or by the use of a spaced sensor such as tachometer 200, as shown in FIG. 4. The rotation of the output shaft is used to drive the tachometer to provide a primary feedback signal or voltage which is proportional to the output speed of the drive.

In the operation of the drive, a source 202, which may comprise a potentiometer or some other variable voltage means, provides a reference voltage or set-point for purposes of comparison with the feedback signal generated by the tachometer 200 and carried in a primary feedback loop 204. The reference voltage represents that voltage which the tachometer will generate if the output speed is equal to the desired operating speed of the drive.

The reference voltage and the feedback signal or voltage are compared in a first summing junction 206. The summing junction, which may be a comparator, determines the voltage and sign difference between the two voltages and provides an error signal of appropriate polarity and magnitude. If the feedback voltage is less than the reference voltage, the voltage difference or error signal is passed to a preamplifier 208, which causes the output of the preamplifier to increase. A device known in the art which will provide the comparator and preamplification function in combination is the operational amplifier. The differential inputs provide a magnitude and sign comparison, while the amplification factor of the device will deliver a power increase. The increase in the voltage output of the preamplifier is applied to the drive, and more particularly the clutch 18, through a power amplifier 212 connected to the clutch coil by means of line 213.

Referring to FIG. 1, the net result is an increase in the power signal to the clutch and the level of excitation of the stationary coil 84 of the clutch. This produces a corresponding increase in the attraction of the armature 80 to the outer field ring 86, which thereby further closes the disc pack by the following movement of the pressure plate 78. Since the transmission of torque is inversely proportional to the thickness of the oil film between the adjacent discs, there is an increase in the torque transmitted by the clutch and the output speed of the drive accompanied by a decrease in the amount of relative slip between the interleaved discs of the disc pack. The direct response of the clutch to the power signal modulation and the degree to which the transmission of torque is related to the thickness of the oil film are believed to be significant factors in the operational movements of the present invention.

The increase in the output voltage of the amplifiers or the power signal to the drive will continue until the feedback voltage or signal from the tachometer matches or balances with the reference voltage. When the voltages are balanced, there is no error signal and the power signal to the drive remains constant in a steady state mode of operation.

If the reference voltage is less than the feedback signal or voltage, the first summing junction will pass an error signal of opposite polarity and the output voltage of the preamplifier will decrease. In a manner similar to that discussed above, the power signal to the drive and the output speed of the drive are decreased, in this instance, until the reference and feedback voltages are balanced.

A minor feedback loop 214, operating through a second summing junction 210 and the power amplifier 212, tends to add increased stability to the system by adding a secondary corrective action. The minor feedback loop operates through the second summing junction 210 in a manner similar to the operation of the primary feedback loop through the first summing junction 206. In this instance, the output of the preamplifier 208 provides a reference signal or voltage to the second summing junction in a manner similar to the provision of the reference signal by the source 202 to the first summing junction 206.

The minor feedback signal is a direct measurement of the power signal to the drive and the clutch current or voltage and, as such, it tends to be proportional to the closing pressure of the clutch disc pack and the torque transmitted by the clutch. The output of the preamplifier 208 tends to be proportional to the desired clutch output torque as reflected by the first corrective action of the summing junction 206 and the primary feedback loop 204. If the signal from the minor feedback loop 214 (a measurement of ultimate clutch current) and the output from the preamplifier 208 (a measure of desired clutch current) are not in balance, the second summing junction 210 passes an appropriate error signal and the output of the power amplifier 212 will be modified to provide a corresponding corrective change in the power signal and the closing pressure applied to the clutch disc pack.

Thus, the operation of each of the two feedback loops tends to cause corrective changes in the clutch output torque in such a manner that both loops will tend to be in balance with their respective reference signals. At any time, if either loop passes back a signal indicating that the clutch current or speed is not at the desired level, a corrective action takes place, as previously described, to bring the clutch current or speed back to the desired level, so that the appropriate feedback signal is again balanced with its respective reference signal. Accordingly, the minor feedback loop serves as an added refinement to the output signal of the preamplifier and tends to stabilize the control system.

It should be appreciated that the clutch output torque or closing pressure is not directly reflected by an electrical signal in a prior art electromechanical system. Accordingly, the closing pressure applied to the clutch disc pack by the mechanical closing actuation of the pneumatic or hydraulic means must be converted to an appropriate electrical signal before it can be employed in the electrical control circuit as a secondary corrective action in a minor feedback loop. Thus, the quality of a minor feedback signal in a prior art system is dependent upon the accuracy of the measurement of the closing pressure as well as the transducers employed to convert the measurement to an electrical signal.

Consequently, the use of a secondary corrective action in a prior art system would result in a relatively more complex system, and the control refinements sought would be inhibited by the required additional mechanical structure and the characteristically slow response time of the same. As a practical matter, prior art systems do not lend themselves to secondary corrective feedback loops, since the benefits to be gained are rather minimal in comparison with the efforts required to achieve them.

In comparison with prior art electromechanical arrangements, the system of the present invention significantly increases the range of controlled speeds when employed with an identical prime mover. For example, an 1800 r.p.m. electric motor results in the provision of a controlled output speed range of from 90 r.p.m. to 1800 r.p.m. when employed in the prior art systems. In contrast, the controlled speed range is from 18 r.p.m. to 1800 r.p.m. when the same motor is employed in the system of the present invention. Thus, the "usable" or controlled speed range is increased from 20:1 to 100:1, based on the maximum r.p.m. output of the motor or prime mover.

In addition, the degree of r.p.m. control or the operating r.p.m. tolerance is substantially improved by the system of the present invention. In the same comparison noted above, the prior art tolerance is ±36 r.p.m.'s and that of the present invention is ±9 r.p.m.'s.

The combination of electrical control and electromagnetic actuation to provide the variable speed drive 10 is dependent upon the provision of the required torque transmission characteristics and coefficient of friction relationships as discussed above and, in turn, these requirements are attained through the use of suitable combinations of liquid and disc compositions, as well as multiple discs. Previously, the selection of liquid and disc combinations in the manufacture of torque-transmitting units was on a trial and error basis, and certain of applicant's prior art units provided satisfactory performance, and can be presumed to embody the proper torque transmission characteristics and coefficient of friction relationships.

Figure 1A:
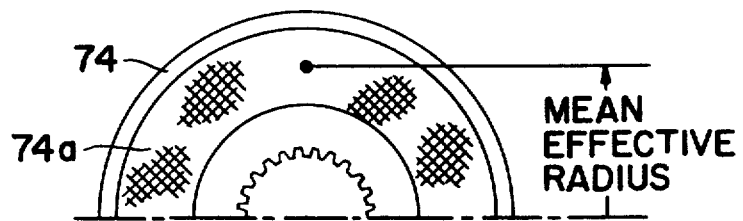
FIG. 1A is an elevational view, on an enlarged scale, of a drive disc having a friction face or surface.

In subsequent developments, acceptable performance was associated with the use of a plurality of discs in the unit whereby the torque loading per disc was less than that in single disc designs for a given total output of torque. It should be appreciated that the transmitted torque is proportional to the multiplication product of the mean effective radius of the disc (i.e., the radial distance from the axis to the center of the friction face of the disc, as shown in FIG. 1A), the actuation or closing force applied to the discs, and the number of films of liquid. It is now believed that the use of plural discs and limitation of the torque loading per disc tend to avoid undesirably thin films of liquid at higher torque loadings, which inhibit the liquid from cooperating with the discs to display suitable torque transmission characteristics and coefficient of friction relationships. Accordingly, the use of a plurality of discs or films of liquid has been found to enable the liquid and discs to cooperatively provide torque transmission at a given power signal which is independent of the output speed of the unit or which slightly decreases with increasing output speed, provided suitable liquid and disc compositions are used. In either case, satisfactory control is obtained, since at a given power signal increasing torque transmission is not encountered with increasing output speed of the unit. In a hydroviscous system which is a slip controlled system, it should be appreciated that if the torque transmitted does increase with output speed, then any slight speed increase will result in higher torques, which in turn will result in further speed increases and torque increases, and this progression will proceed in an unstable runaway manner.

Figure 2:
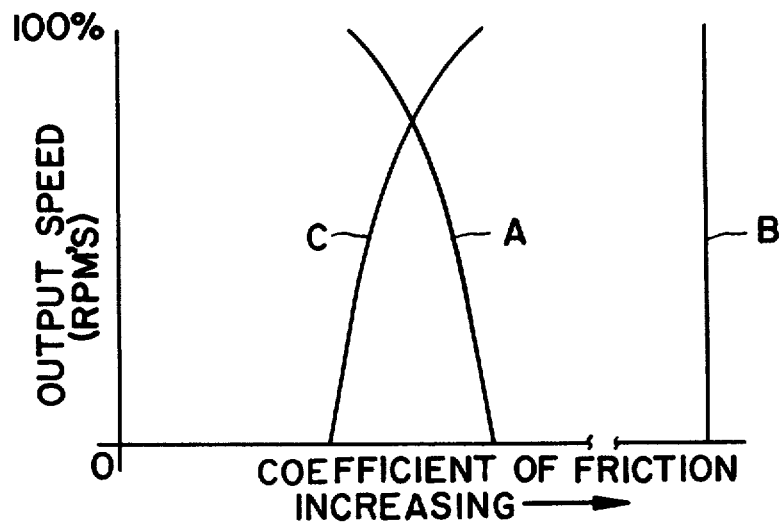
FIG. 2 is a diagrammatic showing of the relationship between the output speed of a torque-transmitting unit and the coefficient of friction between the liquid films and discs under conditions of constant torque-transmission.

Referring to FIG. 2, the required coefficient of friction relationships with respect to output speed of the unit under conditions of constant torque transmission are shown by curves A and B. Curve C illustrates an undesirable relationship which is characteristic of prior art single disc systems, and which can result in plural disc systems in the absence of proper liquid and disc combinations. Prior to discussing the specific curves, it should be appreciated that the output speed of a hydroviscous torque-transmitting unit is inversely related to the relative speed difference between the drive and the driven discs. Thus, the relative speed difference between the discs is at a maximum when the output speed of the unit is zero and the driven discs are not rotating and, under these conditions, the dynamic coefficient of friction between the liquid and the discs is experienced. As the output signal of the unit increases, the rotational speed difference between the drive and driven discs decreases and reaches a zero value when the disc speeds are matched, and the unit "locks in" with a static relative condition between the discs. Under these latter conditions, the static coefficient of friction prevails between the liquid and the discs. Accordingly, a progressive transition from the dynamic coefficient of friction to the static coefficient of friction is experienced between the liquid and the discs with increasing unit output speeds.

In most friction situations, the absolute value of the static coefficient of friction is higher than that of the dynamic coefficient of friction, and this relationship is experienced in ordinary clutch or torque-transmitting applications and is reflected by curve C of FIG. 2. This is not compatible with electronic control, since increases in the coefficient of friction with increases in output speed will in turn increase the transmitted or driving torque and it will be necessary to decrease the power signal in order to balance a given driven load at some higher speed, and the reverse will be true in order to balance torques with decreasing speeds. Thus, increasing output speeds will be associated with decreasing power signals, and decreasing output speeds will be associated with increasing power signals in conflict with the mode of operation of the electrical control, which provides an increasing power signal for purposes of increasing speed and a decreasing power signal for purposes of decreasing speed.

Referring to curve A of FIG. 2, the coefficient of friction decreases with increasing output speed and, in fact, the value of the dynamic coefficient of friction decreases towards the static coefficient of friction which is experienced at zero relative speed difference between the drive and driven discs. In this system, an increase in the output speed of the unit will give rise to a slight decrease in the driving torque and an increase in the power signal is required to balance a given driven load at the higher speed. This is in accordance with the mode of operation of the control, since the corrective action is an increased power signal for purposes of increased speed. Conversely, a decrease in the output speed will give rise to a slight increase in the driving torque, due to the increasing coefficient of friction, and the corrective action is a decrease in the power signal for purposes of driving a given load at a lower speed. Thus, the corrective action is again in accordance with the operation of the electronic control.

The provision of a dynamic coefficient of friction which remains equal to the static coefficient of friction throughout the operating speed range of the unit is illustrated by curve B of FIG. 2. This is also compatible with electronic control, since increasing driving torques do not result upon increasing output speeds of the unit.

Figure 3:
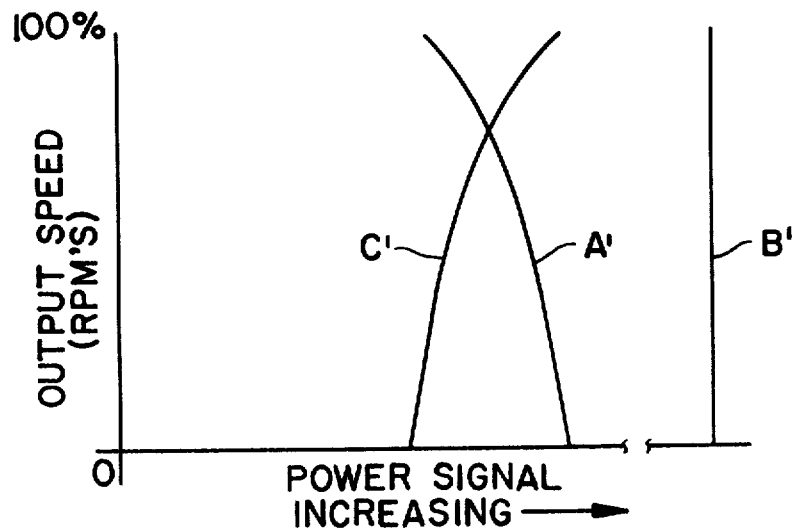
FIG. 3 is a diagrammatic showing of the relationship between the output speed of a torque-transmitting unit and the power signal under conditions of constant torque transmission.

The desirability of the foregoing coefficient of friction relationships in an electronically controlled drive is further illustrated by consideration of the resulting output speed and power signal relationships at a given torque load, as shown in FIG. 3. In FIG. 3, the corresponding curves of FIG. 2 are identified with the same letter reference and the addition of a prime designation. The curves of FIG. 3 are derived by maintaining a fixed load torque on the torque-transmitting unit, selecting various output speeds by adjustment of the control set-point, and measuring the power signal or coil current of the electronic controller to maintain the selected output speed.

As shown by curve A' of FIG. 3, an increasing output speed is always associated with an increasing power signal, and a decreasing output speed is always associated with a decreasing power signal. Thus, the required power signals for speed increases and decreases are in accordance with the mode of operation of the electronic controller.

Curve B' of FIG. 3 illustrates the constant coefficient of friction relationship and provides a controllable drive wherein a given torque load is driven over the full range of output speeds at a single constant power signal value. It should be appreciated that when an increase in output speed is desired, the controller set-point is increased, and an increase in the power signal is required to accelerate the fixed torque load to the higher speed. However, once the higher speed is reached, the power signal returns to the constant value to maintain the increased speed, since the transmitted or driving torque is fixed by virtue of the coefficient of friction relationship and a fixed torque load is being imposed on the unit. In a like manner, a decrease in output speed will require a decrease in the power signal as the driven torque load is slowed to the lower speed, but the power signal will return to the constant value once the slower speed is reached in order to maintain that speed. A selected output speed as determined by the set-point of the controller is maintained by virtue of the increases or decreases in the power signal required to accelerate or decelerate the fixed torque load in order to attain a different output speed. Thus, the systems represented by curves B and B' are operable and tend to be characterized by especially rapid responses to speed changes.

The unacceptability of the coefficient of friction relationship of curve C of FIG. 2 is readily demonstrated by curve C' of FIG. 3. As shown, curve C' requires a decreasing power signal for purposes of increasing output speed and an increasing power signal for purposes of decreasing speed contrary to the operation of the electronic controller. In practice, a torque-transmitting unit displaying the characteristics of curves C and C' results in unstable operation, and tends to run away to the "lock in" condition at output speeds of about 75% or greater of the designed maximum output speed of the unit. This is associated with the increasing slopes of curves C and C' at relatively higher output speeds. The unstable operation and tendency to lock in is depressed by the use of plural discs, which is believed to limit the torque loading per disc and formation of undesirably thin films of liquid as discussed above.

The achievement of hydroviscous torque transmission as reflected by curves A, A', B, and B' is based upon the use of proper liquid and disc combinations, which has been found to primarily govern the coefficient of friction relationship. For different purposes, the effects of various friction materials and their operation with various fluids have been investigated by the automotive industry in order to develop systems that shift gear ratios smoothly. Although the automotive materials were developed for different purposes which do not involve the electronic control of hydroviscous torque transmission or contemplate the dependence of a servo control on certain frictional characteristics, the categories or classes of materials developed by the automotive industry are conveniently used herein to illustrate the required torque transmission characteristics and coefficients of friction relationships, as well as to provide examples of suitable liquid and disc compositions which are commercially available. The selection and combination of these items are discussed below.

Suitable liquids comprise light grade oils which have been specially compounded with a "static suppressant additive" which aids in promoting static to dynamic coefficient of friction ratios having a value of 1 or less. The static suppressant additives and compounding techniques are known in the art, and typical examples include the addition of up to 25% by weight of sperm oil or oleic acid to a mineral oil. The mineral oil serves as a base material and a typical compounded mineral oil has a viscosity of 50.5 SUS at 210° F. The static suppressant additives tend to depress or lower the static coefficient of friction without significantly affecting the dynamic coefficient of friction. Accordingly, light grade oils compounded with static suppressant additives are found to promote the desired coefficient of friction relationships herein and to enable a dynamic coefficient greater than the static coefficient when used with the pertinent disc compositions.

There are a number of commercially available oils which provide the desired coefficient of friction relationships, and these include Dexron I and II. (Dexron is a trademark of the General Motors Corporation). Typically, any oil meeting the current General Motors specifications for Dexron II will be satisfactory. Other commercially available oils include JD 303, distributed by Deere & Co., and Union hydraulic/tractor fluid oils, distributed by the Union Oil Company of California. Hydraulic transmission fluids developed for use in tractors and containing static suppressant additives tend to be suitable, and such fluids meeting General Motors' specification C-2 for hydraulic transmission fluids are satisfactory. Similarly, suitable performance is provided by oils meeting the Ford Motor Company's tractor hydraulic fluid transmission specifications M-2C41, M-2C65A, M-2C65C, M-2C77A, or M-2C79A.

The foregoing liquids or oils are used in combination with appropriate disc materials to provide the desired performance. More particularly, the friction faces or surfaces of the faced discs should be formed of fibrous materials bonded within a suitable synthetic resin matrix; the discs interleaved therewith may be formed of unlined steel. Illustrative disc friction face compositions comprise mixtures of up to 40% each of cellulose fiber and inorganic fillers such as diatomaceous earth, compounded with from 5% to 10% asbestos fiber, in a suitable thermosetting resin binder. The fibrous or cellulosic materials tend to raise or increase the dynamic coefficient of friction without significant effect upon the static coefficient of friction and, thus, cooperate with suitable liquids to provide a static to dynamic coefficient of friction ratio equal to 1 or less.

There are a number of commercially available discs that are faced with dynamic coefficient of friction increasing compositions. Commercially available discs that are suitable include: Borg-Warner Corp. automotive transmission disc model Nos. 715, 1240, 1470, 1053, and 1053L; Raybestos Manhattan clutch disc model Nos. 4893-1 and 3762-3; and the S. K. Wellman Corp. clutch disc model No. 252.

In contrast with the foregoing liquid and disc combinations, the undesirable performance shown by curves C and C' is representative of that derived when improper materials or combinations of materials are used. For example, Type F automotive transmission fluid is not satisfactory, regardless of the type of disc with which it is used. It has also been found that discs having a metallic (bronze or steel) or cork friction face do not provide the desired performance. For example, bronze friction face drive discs and steel driven discs in combination with Dexron II liquid do not provide suitable performance. Consequently, the present invention contemplates both the selection of proper liquid and disc compositions.

In accordance with the present invention, the manufacture of hydroviscous torque-transmitting units combining electrical control and electromagnetic actuation is possible. The invention is based upon a number of discoveries including that the thickness of the torque-transmitting film intermediate adjacent discs is sufficiently related to the torque transmitted to warrant the exact control of its thickness by an electrical control system and electromagnetic actuation. The practical use of this relationship requires the further discoveries herein relating to the role of the coefficient of friction between the liquid and discs in hydroviscous torque transmission, and that the coefficient of friction can be modified through the use of special liquid and disc compositions, as well as a plurality of films of liquid or discs to provide torque transmission characteristics which can be combined with electrical control.

Figure 5:
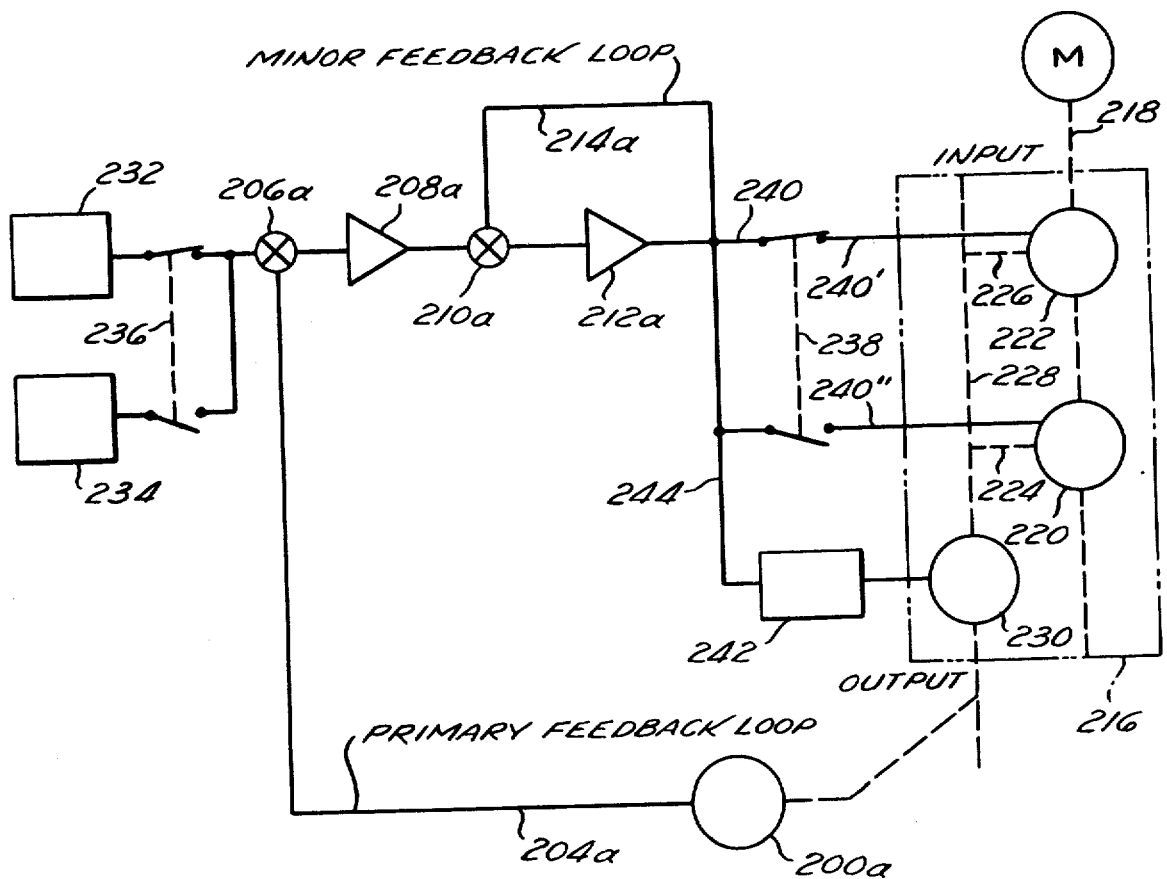
FIG. 5 is a block diagram of another embodiment of the control system of the present invention employed with a variable speed drive including forward and reverse clutch units and a brake.

The same control principles described above may be used for controlling the operation of a two-speed drive unit arranged for forward and reverse operation. As shown in FIG. 5, a drive unit 216 (shown in phantom) is provided with an electric motor M connected to an input shaft 218. The input shaft carries a forward clutch 220 and a reverse clutch 222, each of these clutches utilizing electromagnetic actuation. The clutches are mechanically connected at 224 and 226, respectively, to an output shaft in opposite directions when actuated. This is achieved in any suitable manner, such as by the use of gear and chain drives between the clutches and the output shaft. The drive unit is also provided with a brake 230 which is mounted on the output shaft. The brake is also electromagnetically actuated and its operation is governed by the control system.

In this instance, two reference voltage sources 232 and 234 are employed to provide two-speed operation of the drive. Of course, a single reference voltage source could be employed with appropriate circuitry to provide multiple reference voltages.

As shown in FIG. 5, the reference voltage to be employed is chosen by means of a speed selector switch 236. Similarly, the direction of operation is controlled by a direction selector switch 238. As illustrated, the switches are arranged to simply mechanically open the circuitry of the nonselected reference voltage source and clutch.

The control circuit shown in FIG. 5 is generally similar in structure and operation to that shown in FIG. 4, and like components are similarly numbered but for the addition of the letter designation "a." Accordingly, the output speed of the clutch is essentially controlled by a primary feedback loop 204a and a minor feedback loop 214a in a circuit which includes the appropriate summing junctions and amplifiers.

If the feedback voltage exceeds the reference voltage as a result of the change in the desired speed of operation or for any other reason, such as the driven load tending to overrun the drive, the same corrective responses are provided by the control system as previously discussed. Specifically, the polarity of the error signal changes and the power signal to the drive or operating clutch carried by lines 240 and 240' is decreased by virtue of a decrease in the output of the preamplifier 208a and power amplifier 212a.

In addition to this corrective response, the decrease in the output of the power amplifier 212a is sensed by a solid state switch 242, via line 244, which causes energization of the brake 230 and rapid deceleration of the output speed. Specifically, the solid state switch causes the brake to engage when the voltage in line 240 drops below a preselected brake actuation or turn-on value. Accordingly, a desired decrease in the output and load speed is achieved more rapidly and an overrunning load is positively retarded by the brake.

It should be appreciated that the drive 10 shown in FIG. 4 may be modified to include a brake unit which is controlled by a solid state switch in a manner essentially identical to that discussed above. In this instance, the brake unit would be mounted on the same shaft with the clutch 18 and the operation of the brake would be controlled by a solid state switch arranged to sense a decrease in the output of the power amplifier 212 which is carried by the line 213.

Referring once again to FIG. 5, the direction of operation of the drive 216 is controlled by switch 238, as previously indicated. If the switch is operated to open the connection with line 240' and clutch 222, the power signal is applied to clutch 220 by means of line 240". Upon actuation, the clutch 220 initially acts as a brake, since it is driving the output shaft in an opposite direction.

The clutch thereby provides rapid deceleration of the output shaft to a zero r.p.m. value and, thereafter, immediate acceleration of the shaft in the selected opposite direction to a speed corresponding to the reference voltage. It should be appreciated that with the addition of a different direction selector switch (not shown) which is arranged to place the solid state switch in the circuit of the nonselected clutch regardless of the direction of operation of the drive, the nonselected clutch could be employed for purposes of deceleration and the brake could be eliminated from the drive unit.

In addition to eliminating the prior art problems discussed above, the control principles of the present invention may also be employed to overcome two further control problems which are unique to the use of electromagnetic actuation in a hydroviscous variable speed drive provided with a brake unit or its functional equivalent. These problems are briefly discussed below.

In an electromagnetic system, the only significant lag in response time is due to the inductive nature of the clutch or brake coil itself. Specifically, there is a tendency for a current increase or decrease in the coil to lag behind a change in the power signal to the clutch or brake. Thus, there is a finite lag time proportional to the inductance of the coil.

The brake actuation or turn-on value in such a system must be selected at or near a zero power signal to the clutch which indicates a condition wherein the feedback signal exceeds the reference signal in order to obtain maximum utilization of the brake in a decelerating system. When the brake is employed in an on-off mode of operation, it is apparent that the actuation of the brake to its full capacity at a time when the control system is at or near a balanced condition will result in significant overshoot and an undesirable level of hunting. This problem is particularly critical in an electromagnetic system, since the finite lag times resulting from the inductive nature of the brake coil will cause the "effective" brake disengagment to occur at a time after the speed actually decreases to a value below the reference signal.

The second problem which is resolved by the control principles of the present invention results from an inherent characteristic of hydroviscous torque transmission.

Specifically, all hydroviscous clutches employed in a drive application having a constant speed input develop a residual driving or output torque even when they are not actuated by a positive closing pressure. The residual driving torque is a result of the close proximity of the continuously rotating drive discs and the driven discs, and the presence of oil therebetween which exerts a "drag" effect upon the driven discs.

The magnitude of the residual driving torque transmitted is related to the amount of oil present between adjacent discs. For example, a clutch component having a pump arranged to continuously deliver oil to the disc pack at a positive pressure will have a residual driving torque equal to about 5% of the maximum torque output of the drive unit. In a unit without such a pump, a lesser amount of oil will still be drawn into the disc pack by virtue of the centrifugal pumping action of the rotating drive discs, and the residual driving torque will equal about 1% to 2% of the maximum torque output value.

In the absence of a brake unit, it is apparent that the reference voltage cannot be employed to provide a corresponding output speed which requires a transmitted torque value less than the residual driving torque if the load friction is not sufficient to overcome the effects of the latter. Further the use of a brake in an on-off mode of operation is subject to the same hunting problems discussed above. However, in this instance the problems are somewhat worse in that the entire control operation is in a range relatively close to the brake actuation or turn-on point, since the reference voltage will be set at a low value.

Referring to FIG. 6, a block diagram of another embodiment of the control system of the present invention is shown. This control system employs multiple closed-loop control circuits to overcome the foregoing problems and effectively obtain the advantages of an electrical control system in combination with an electromagnetic torque-transmitting unit.

As shown in FIG. 6, a variable drive speed drive 246 (shown in phantom) is provided with an electromagnetic actuated clutch 248 and brake 250. The clutch and brake are mounted on a single input and output shaft, and an electric motor M is arranged to provide a constant speed input.

A source 252 provides a reference voltage in a manner similar to that previously discussed. The operation of the clutch is controlled by a first closed-loop control circuit, shown in the upper half of the block diagram circuit of FIG. 6, in the same fashion as the clutch 18 is controlled. Accordingly, the like components are identically numbered but for the addition of the letter designation "b."

The operation of the brake is controlled by a second closed-loop control circuit shown in the lower portion of the block diagram of FIG. 6, and the operation thereof is identical in principle with the control of the clutch 248 but for an inversion or sign change of the control signals carried by the brake circuit. Accordingly, the brake circuit includes a first summing junction 254, a preamplifier 256, a second summing junction 258, a power amplifier 260, and a minor feedback loop 262, which operate in the same manner as previously discussed. It should be appreciated that the excitation of the brake coil and attraction of the pressure plate to close the disc pack will be obtained irrespective of the sign of the voltage or current applied to the coil.

In order to achieve a sign change or signal inversion in the brake circuit, the reference signal to the brake is passed through an inverter 264. Similarly, the primary feedback signal to the brake is passed through a second inverter 266. Thus, both of the signal inputs to the brake circuit are inverted and the brake control circuit operates with a signal of the same magnitude as that of the clutch circuit but having an opposite sign.

In the operation of the control circuit, a primary feed-back signal which is less than the reference voltage results in a proportional error signal which causes the power signal to the clutch 248 to correspondingly increase. The brake circuit will simultaneously be exposed to the same control signals but of the opposite sign so as to maintain or cause disengagement of the brake 250.

In a decelerating system, the increase of the feedback signal over the reference voltage will cause a zero power signal to the clutch and disengagement thereof. The brake unit will be simultaneously actuated to apply a braking torque to the load and an appropriate speed decrease. In contrast with the on-off mode of operation, the error signal to the brake will be proportional to the desired speed adjustment and the tendency to overshoot will be substantially eliminated. In this instance, the brake signal "anticipates" the point of brake disengagement at the new steady state condition and the power signal to the brake is slowly diminished in advance of the actual brake disengagement.

In addition to anticipating brake disengagement, the control system also permits a dampening of the brake response which is desirable in reducing the hunting of the system at a near steady state condition. Specifically, the amplifier gain in the brake circuit may be selected at a value less than that of the clutch circuit in order to depress the brake response and thereby compensate for the decelerating effect of the load. Alternatively, the gain of the clutch circuit may be provided at a value less than that of the brake circuit when the load has an overhauling tendency in a major portion of its movement.

When it is desired to operate the drive at an output speed which requires a transmitted torque value less than the residual driving torque and the latter is not overcome by the load friction, the brake unit and controller of FIG. 6 establish and maintain such a desired speed by providing a braking function whenever the reference signal is less than the feedback signal until a signal balance is obtained. Thus, the embodiment shown in FIG. 6 not only overcomes the residual driving torque problems, but also enables the stopping of the load without overshoot or excessive hunting.

If the reference voltage is adjusted to provide a zero load speed or a load speed requiring an output torque less than the residual driving torque, the clutch summing junctions continue to pass appropriate error signals to provide and maintain a zero power signal voltage to the clutch. The brake summing junctions operate through the brake amplifiers to simultaneously cause actuation of the brake and provide a load speed corresponding to zero or the r.p.m. value corresponding to the adjusted reference voltage. Any tendency of the residual driving torque to move the load creates an unbalanced feedback signal which maintains the actuation of the brake. In this instance, the positive corrections of the controller are effected through the brake circuitry of the control unit.

Referring to FIG. 7, a variable speed drive 268 is shown (in phantom) which provides forward and reverse operation, as well as a positive or retarding torque in either direction. The drive includes an input shaft 270 which is connected to an electric motor M. The input shaft carries a forward clutch 272 and a reverse clutch 274 which are mechanically arranged to drive an output shaft 276 in opposite directions. Each of the clutches is electromagnetically actuated and the respective mechanical connections with the output shaft may be the same as those discussed with respect to the embodiment shown in FIG. 5.

The forward clutch 272 is controlled by a first closed loop circuit substantially identical to that discussed above with respect to the clutch 248 and the reverse clutch 274 is controlled by a second closed-loop circuit corresponding to that of the brake 250. In this instance, it should be understood that a simple braking function would merely be provided by the reverse drive of the clutch 274 as applied to the output shaft by means of the mechanical connection therewith.

A reference source 278 which provides a zero center negative and positive signal is employed in this embodiment. Thus, the reference source can be set to provide either a positive or negative signal to thereby operate the drive in a corresponding forward or reverse direction. In addition, the reference source can be set at a zero value to stop the drive and retain the load in a stationary position.

A tachometer 200c is employed to sense the speed of the load and provide a primary feedback signal. In this instance, the tachometer is of a type which provides signals of opposite signs when rotated in alternate directions.

If the forward operation of the drive is assigned a positive reference signal, the inversion of the reference and feedback signals by the reverse clutch control circuit imparts a braking function to the reverse clutch whenever the output speed exceeds the value corresponding to the selected reference voltage. If the source 278 is adjusted to provide a negative reference signal, the reverse clutch then operates to drive the load and the forward clutch provides a brake function whenever the output speed in the reverse direction exceeds the selected negative reference signal.

Accordingly, the drive 268 is operable in either direction with a positive driving or retarding torque. In addition, the reference signal may be adjusted to zero to stop the movement of the load and any tendency for the load to move will result in an error signal to the appropriate retarding clutch. This clutch will be continuously actuated until the retarding torque returns the load to a stationary position and the control system is again in balance.

The invention is not restricted to the slavish imitation of each and every one of the details described above, which have been set forth merely by way of example with the intent of most clearly setting forth the teachings of the invention. Obviously, devices may be provided which change, eliminate, or add certain specific detils without departing from the invention.

What is claimed is:

1. In a method of manufacturing a variable speed drive having an input shaft, an output shaft, a hydroviscous clutch connecting the shafts, the clutch being of the type wherein films of liquid are maintained between adjacent discs, and torque transmission varies inversely with the thickness of the films, that is, inversely with the spacing between the discs, the improvement comprising the steps of providing means for combining (1) electromagnetic actuation of the clutch to vary the spacing and film thickness between adjacent discs and thereby provide corresponding changes in torque transmission under the control of an electrical power signal with (2) electronic conversion of sensed output errors to modulations of the power signal, and selecting said liquid and said discs so that, upon increasing drive output speeds, the dynamic coefficient of friction between the liquid and the discs remains equal to or decreases towards the static coefficient of friction, said discs including one or more friction surfaces of bonded fibrous material, and said liquid comprising a light grade oil specially compounded to cooperate with said discs to promote said dynamic and static coefficient of friction relationship.

2. A method as set forth in claim 1, wherein said oil is specially compounded to include a static suppressant additive and said fibrous material is bonded with a synthetic resin.

3. A method as set forth in claim 2, wherein said oil is mineral oil, said static suppressant additive is present in an amount up to about 25% by weight and is selected from the group consisting of oleic acid and sperm oil, said fibrous material is selected from the group consisting of cellulose fibers, asbestos fibers, and combinations thereof, and said synthetic resin is a thermosetting resin.

4. A method as set forth in claims 1, 2, or 3, wherein the step of selecting said liquid and discs includes providing a plurality of discs and torque-transmitting films whereby the torque loading per disc is less than that of single disc designs for a given total output torque to facilitate said dynamic and static coefficient of friction relationships.

5. A method as set forth in claims 1 or 3 wherein the means for combining electronic conversion of sensed output errors comprise a closed-loop electrical control circuit including speed sensing means producing a primary feedback signal substantially proportional to the rotational speed of said output shaft and source means providing a reference signal corresponding to a predetermined output shaft speed, said primary feedback signal being carried in a primary feedback loop of said control circuit which includes first comparison means for determining the magnitude and sign difference between said feedback and reference signals and modulating said power signal in a first corrective action, said control circuit also including a minor feedback loop carrying a minor feedback signal comprising a direct measurement of the electrical input to a coil of said clutch and second comparison means for determining the magnitude and sign difference between said minor feedback signal and the output of said first comparison means and further modulating said power signal in a second corrective action.

6. A method as set forth in claim 1, wherein the means for combining electronic conversion of sensed output errors comprise a closed-loop electrical control circuit including a primary feedback loop and associated first comparison means for providing a first corrective modulation of said power signal, and a minor feedback loop and associated second comparison means for providing a second corrective modulation of said power signal.

7. A method as set forth in claim 6, wherein the inputs to said first comparison means comprise a primary feedback signal which is proportional to the speed of said output shaft and a reference signal which corresponds to a preselected output shaft speed, and the inputs to said second comparison means comprise a minor feedback signal which is a directly sensed electrical value that tends to be proportional to the output torque of said clutch and the output of said first comparison means.

8. A method as set forth in claim 1, wherein the means for combining electronic conversion of sensed output errors comprise a closed-loop electrical control circuit including a primary feedback loop and associated first comparison means for providing a first corrective modulation of said power signal.

9. A method as set forth in claim 8, wherein said drive includes a hydroviscous, electromagnetically actuated brake operably connected to said output shaft to retard the output shaft speed under the control of a brake electrical power signal, and the means for combining electronic conversion of sensed output errors include a second closed-loop electrical control circuit for providing corrective modulation of said brake electrical power signal.

10. A method as set forth in claim 8, wherein said drive includes a second hydroviscous, electromagnetically actuated clutch operably connected to drive said output shaft in an opposite direction under the control of a second electrical power signal, and the means for combining electronic conversion of sensed output errors include a second closed-loop electrical control circuit for providing corrective modulations of said second electrical power signal.

11. A method as set forth in claim 8, wherein said drive includes a hydroviscous, electromagnetically actuated brake operably connected to said output shaft to retard the output shaft speed, and said closed-loop electrical control circuit includes a solid state switch operable to sense decreases in said power signal and actuate said brake.

12. A method as set forth in claim 8, wherein said drive includes a second hydroviscous, electromagnetically actuated clutch operably connected to drive said output shaft in an opposite direction, and said closed-loop electrical control circuit includes switch means for alternatively applying said power signal to one of said clutches.

13. A method of manufacturing a torque-transmitting unit for controlling the transmission of torque between a rotating input member and a rotationally driven output member, said torque-transmitting unit being of the hydroviscous disc type wherein films of liquid are maintained between adjacent discs and torque transmission varies inversely with the thickness of the films, that is, inversely with the spacing between the discs, comprising providing means for combining (1) electromagnetic variations of the spacing and film thickness between adjacent discs to thereby provide corresponding changes in torque transmission under the control of an electrical power signal with (2) electronic conversion of sensed output errors to modulations of the power signal, and selecting said liquid and said discs so that, upon increasing drive output speeds, the dynamic coefficient of friction between the liquid and the discs remains equal to or decreases towards the static coefficient of friction, said discs including one or more friction surfaces of bonded fibrous material, and said liquid comprising a light grade oil specially compounded to cooperate with said discs to promote said dynamic and static coefficient of friction relationship.

14. A method as set forth in claim 13, wherein said oil is mineral oil specially compounded to include up to about 25% of an additive selected from the group consisting of oleic acid and sperm oil and said fibrous material is selected from the group consisting of cellulose, asbestos, and combinations thereof bonded in a synthetic resin matrix.

15. A method as set forth in claim 13, wherein said oil is specially compounded to include a static suppressant additive and said fibrous material is bonded with a synthetic resin.

16. A method as set forth in claims 13, 14, or 15, wherein the step of selecting said liquid and discs includes providing a plurality of discs and torque-transmitting films whereby the torque loading per disc is less than that of single disc designs for a given total output torque to facilitate said dynamic and static coefficient of friction relationships.

17. In a method of manufacturing a variable speed drive having a rotating input member and a rotationally driven output member, a hydroviscous clutch connecting the members, the clutch being of the type wherein films of liquid are maintained between adjacent discs, and torque transmission varies inversely with the thickness of the films, that is, inversely with the spacing between the discs, the improvement comprising the steps of providing means for combining (1) electromagnetic actuation of the clutch to vary the spacing and film thickness between adjacent discs and thereby provide corresponding changes in torque transmission under the control of an electrical power signal with (2) electronic conversion of sensed output errors to modulations of the power signal and providing a plurality of discs and torque-transmitting films whereby the torque loading per disc is less than that of single disc designs for a given total output torque and there are facilitated at a given power signal and increasing drive output speeds dynamic coefficients of friction between the liquid and the discs which remain equal to or decrease towards static coefficients of friction and transmitted driving torques which remain constant or decrease, said discs including a plurality of friction surfaces of bonded fibrous material, and said liquid comprising a light grade oil specially compounded to cooperate with said discs to promote said coefficient of friction relationships and transmitted driving torque characteristics.

18. A method as set forth in claim 17, wherein said oil is mineral oil specially compounded to include up to about 25% of a static suppressant additive selective from the group consisting of oleic acid and sperm oil and said fibrous material is selected from the group consisting of cellulose, asbestos, and combinations thereof bonded in a synthetic resin matrix.

19. A method as set forth in claim 17 or claim 18, wherein the means for combining electronic conversion of sensed output errors comprise a closed-loop electrical control circuit including a feedback loop and associated comparison means for providing corrective modulation of said power signal.

20. In a method of manufacturing a variable speed drive having a rotating input member and a rotationally driven output member, a hydroviscous clutch connecting the members, the clutch being of the type wherein films of liquid are maintained between adjacent discs, and torque transmission varies inversely with the thickness of the films, that is, inversely with the spacing between the discs, the improvement comprising the steps of providing means for combining (1) electromagnetic actuation of the clutch to vary the spacing and film thickness between adjacent discs and thereby provide corresponding changes in torque transmission under the control of an electrical power signal with (2) electronic conversion of sensed output errors to modulations of the power signal, and selecting said liquid and said discs so that the torque transmitted by the drive at a given power signal does not increase with increasing drive output speeds, said discs including one or more friction surfaces of bonded fibrous material, and said liquid comprising a light grade oil specially compounded to cooperate with said discs to promote said transmitted torque characteristics of the drive.

21. A method as set forth in claim 20, wherein the torque transmitted by the drive at a given power signal remains equal to or decreases towards the torque transmitted at the maximum operating drive output speed.

22. A method as set forth in claim 20, wherein said oil is mineral oil specially compounded to include up to about 25% of a static suppressant additive selected from the group consisting of oleic acid and sperm oil and said fibrous material is selected from the group consisting of cellulose, asbestos, and combinations thereof bonded in a synthetic resin matrix.

23. In a method of manufacturing a variable speed drive having an input shaft, an output shaft, a hydroviscous clutch connecting the shafts, the clutch being of the type wherein films of liquid are maintained between adjacent discs, and torque transmission varies inversely with the thickness of the films, that is, inversely with the spacing between the discs, the improvement comprising the steps of providing means for combining (1) electromagnetic actuation of the clutch to vary the spacing and film thickness between adjacent discs and thereby provide corresponding changes in torque transmission under the control of an electrical power signal with (2) electronic conversion of sensed output errors to modulations of the power signal, and selecting said liquid and said discs so that upon increasing drive output speeds, and with constant torque loads, the energizing current requirements of the clutch remain the same or increase, and upon decreasing drive output speeds, and with constant torque loads, the energizing current requirements of the clutch remain the same or decrease, said discs including one or more friction surfaces of bonded fibrous material, and said liquid comprising a light grade oil specially compounded to cooperate with said discs to promote said energizing current requirements.

24. A method as set forth in claim 23, wherein said oil is specially compounded to include a static suppressant additive and said fibrous material is bonded with a synthetic resin binder to provide a static to dynamic coefficient of friction ratio between the liquid and the discs equal to 1 or less.

25. A method as set forth in claim 24, wherein said oil is mineral oil, said static suppressant additive is present in an amount up to about 25% by weight and is selected from the group consisting of oleic acid and sperm oil, said fibrous material is selected from the group consisting of cellulose fibers, asbestos fibers, and combinations thereof, and said synthetic resin is a thermosetting resin.

26. A method as set forth in claims 23, 24, or 25, wherein the step of selecting said liquid and discs includes providing a plurality of discs and torque-transmitting films whereby the torque loading per disc is less than that of single disc designs for a given total output torque to facilitate said dynamic and static coefficient or friction relationships.

27. A method of manufacturing a torque-transmitting unit for controlling the transmission of torque between a rotating input member and a rotationally driven output member, said torque-transmitting unit being of the hydroviscous disc type wherein films of liquid are maintained between adjacent discs and torque transmission varies inversely with the thickness of the films, that is, inversely with the spacing between the discs, comprising providing means for combining (1) electromagnetic variations of the spacing and film thickness between adjacent discs to thereby provide corresponding changes in torque transmission under the control of an electrical power signal with (2) electronic conversion of sensed output errors to modulations of the power signal, and selecting said liquid and said discs so that upon increasing drive output speeds, and with constant torque loads, the energizing current requirements of the torque-transmitting unit remain the same or increase, and upon decreasing drive output speeds, and with constant torque loads, the energizing current requirements of the torque-transmitting unit remain the same or decrease, said discs including one or more friction surfaces of bonded fibrous material, and said liquid comprising a light grade oil specially compounded to cooperate with said discs to promote said energizing current requirements.

28. A method as set forth in claim 27, wherein said oil is specially compounded to include a static suppressant additive and said fibrous material is bonded with a synthetic resin binder to provide a static to dynamic coefficient of friction ratio between the liquid and the discs equal to 1 or less.

29. A method as set forth in claim 28, wherein said oil is mineral oil, said static suppressant additive is present in an amount up to about 25% by weight and is selected from the group consisting of oleic acid and sperm oil, said fibrous material is selected from the group consisting of cellulose fibers, asbestos fibers, and combinations thereof, and said synthetic resin is a thermosetting resin.

30. A method as set forth in claims 27, 28, or 29, wherein the step of selecting said liquid and discs includes providing a plurality of discs and torque-transmitting films whereby the torque loading per disc is less than that of single disc designs for a given total output torque to facilitate said dynamic and static coefficient of friction relationships.

31. In a method of manufacturing a variable speed drive having a rotating input member and a rotationally driven output member, a hydroviscous clutch connecting the members, the clutch being of the type wherein films of liquid are maintained between adjacent discs, and torque transmission varies inversely with the thickness of the films, that is, inversely with the spacing between the discs, the improvement comprising the steps of providing means for combining (1) electromagnetic actuation of the clutch to vary the spacing and film thickness between adjacent discs and thereby provide corresponding changes in torque transmission under the control of an electrical power signal with (2) electronic conversion of sensed output errors to modulations of the power signal, the means for combining electronic conversion of sensed output errors comprising a closed-loop electrical control circuit including a feedback loop and associated comparison means for providing corrective modulation of said power signal, and providing a plurality of discs and torque-transmitting films whereby the torque loading per disc is less than that of single disc designs for a given total output torque and there are facilitated at a given power signal and increasing drive output speeds dynamic coefficients of friction between the liquid and the discs which remain equal to or decrease towards static coefficients of friction and transmitted driving torques which remain constant or decrease.

* * * * *